Dec. 7, 1954    C. W. LINCOLN ET AL    2,696,126
TRANSMISSION CONTROL
Filed Nov. 28, 1950    3 Sheets-Sheet 1
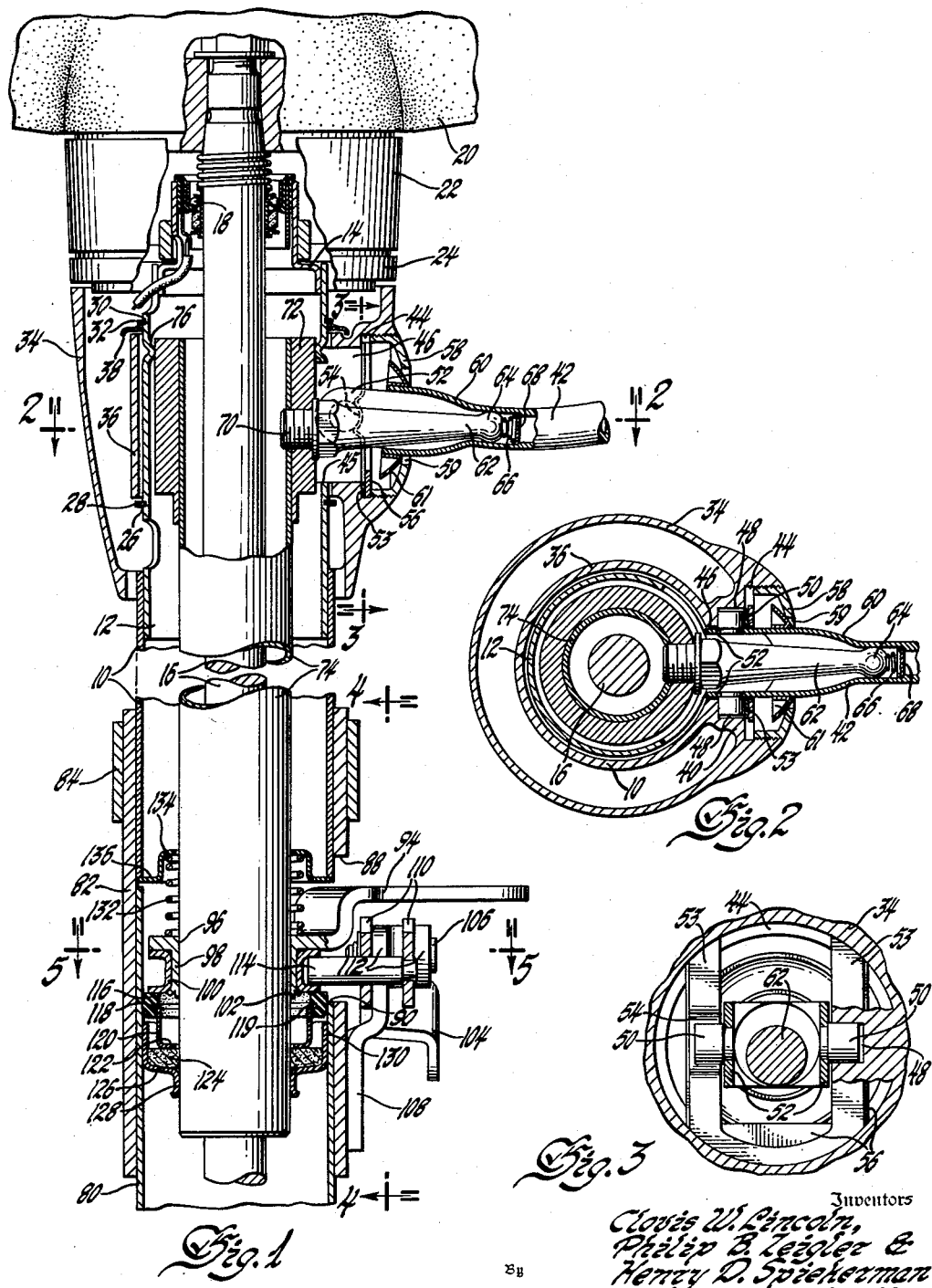

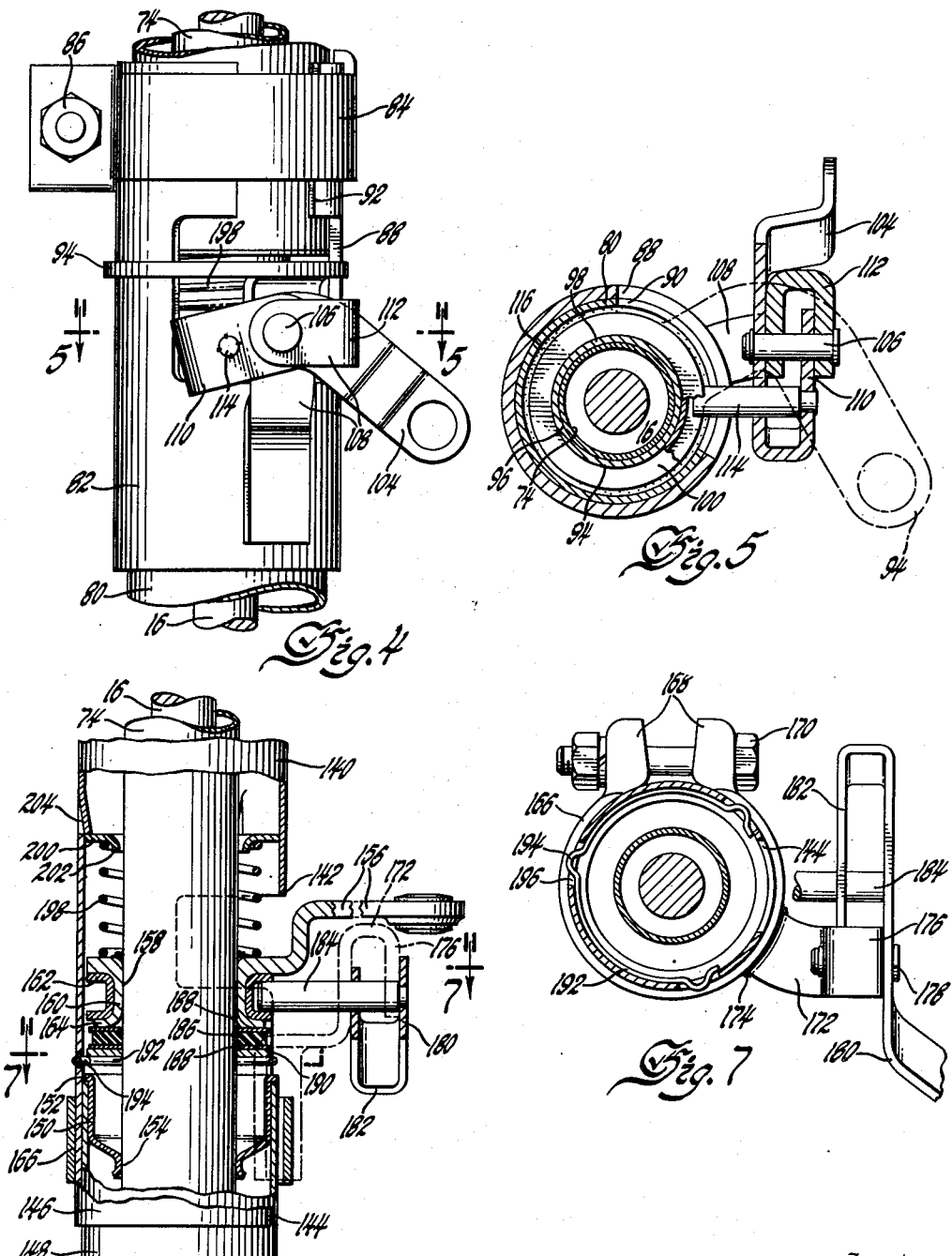

Dec. 7, 1954   C. W. LINCOLN ET AL   2,696,126
TRANSMISSION CONTROL
Filed Nov. 28, 1950   3 Sheets-Sheet 3
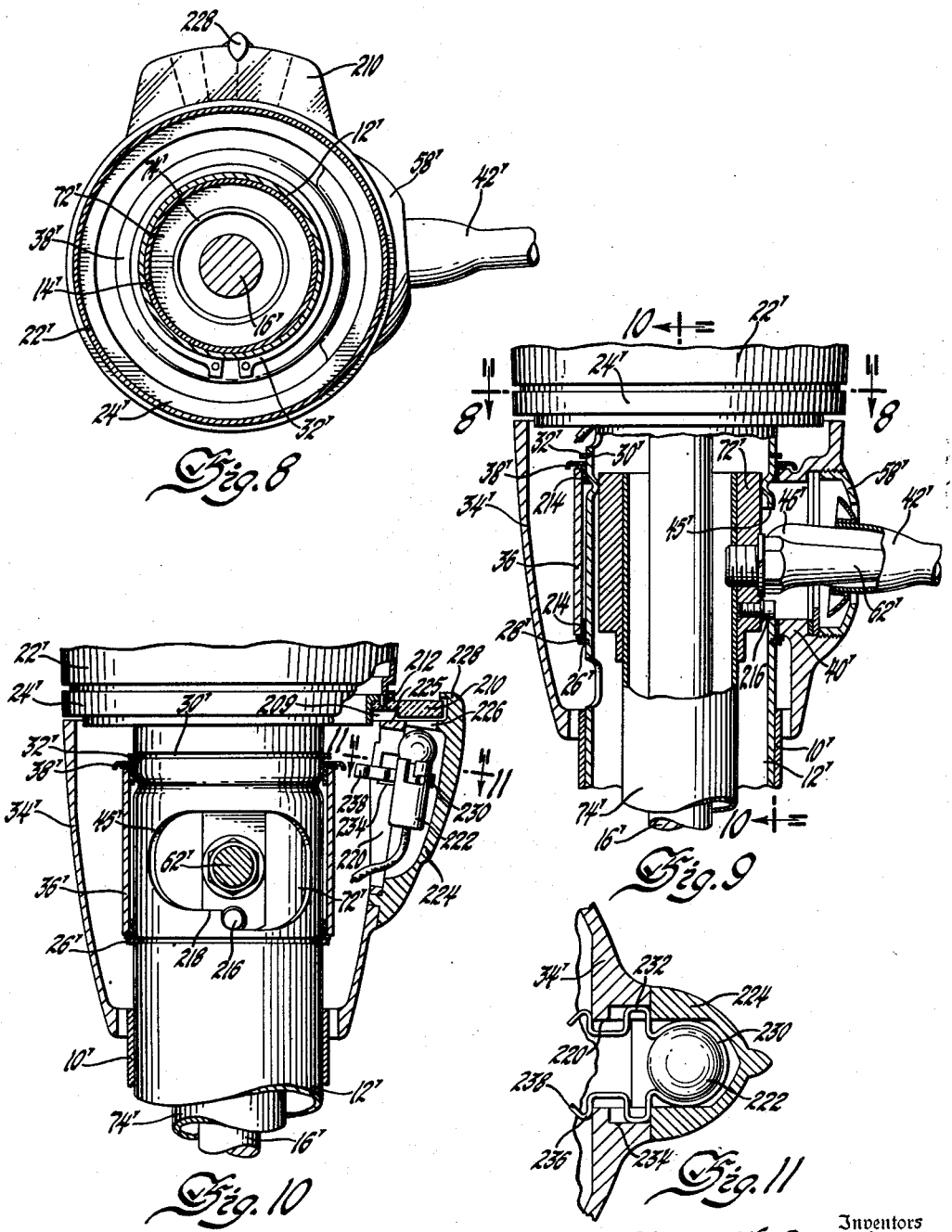
Inventors
Clovis W. Lincoln,
Philip B. Zeigler &
Henry O. Spiekerman
By Williton Helwig & Caillo
Attorneys United States Patent Office 2,696,126
Patented Dec. 7, 1954

2,696,126

TRANSMISSION CONTROL

Clovis W. Lincoln, Philip B. Zeigler, and Henry D. Spiekerman, Saginaw, Mich., assignors to General Motors Corporation, Detroit, Mich., a corporation of Delaware Application November 28, 1950, Serial No. 197,956

21 Claims. (Cl. 74—484)

This invention relates to improvements in variable speed transmission control mechanism and more particularly to the speed shifting control apparatus for motor vehicle control transmission which is adapted to be mounted on the steering column structure of a vehicle.

The invention is illustrated in a transmission speed control mechanism mounted on a steering column structure of a vehicle. The hand control lever is positioned just beneath the steering wheel with the inner end pivoted to a rotatable shell mounted concentrically on the steering column and the outer end extending in a generally radial direction to a point adjacent the edge of the steering wheel. The inner end of the hand lever is pivoted to the shell at its inner end and pivotally engages a stud lever at a point intermediate its ends. The stud lever is rigidly connected to a control tube mounted concentrically with the steering shaft and inside the steering column. The control tube is mounted on a guide to allow both rotary and reciprocating movement of the control tube under the influence of the hand control lever. The control tube extends downwardly to the lower end of the steering column to a point adjacent the transmission where a shift lever is secured to the control tube. A cam guide is also secured to the tube at this point. A selector lever is pivotally secured to the steering column and has a fixed pin extending into the selector cam. In this gearshift control mechanism the vertical movement of the hand control lever will move the control tube vertically within the steering column and actuate the selector lever. Rotary movement of the hand control lever about the axis of the steering column will rotate the control lever, the shell, the control tube, and the shift lever as a unit. Thus, the rotation of the hand control lever will rotate the control tube and shift lever which extends through a suitable aperture in the lower portion of the steering column. The selector lever and the shift lever are connected by suitable rods to the transmission.

A primary object of this invention is to provide an improved transmission control mechanism consisting of a minimum number of simplified parts which is adapted to be mounted on a steering column for actuating a speed control transmission for vehicles. A further object of the invention is to provide in a speed control mechanism mounted on the steering column a shell member rotatably supported on said steering column and having a recessed pivotal mounting for a hand control lever.

A further object of the invention is to provide in a gearshift control mechanism mounted on a steering column a shell member pivotally supported on the column and having a recessed pivot and a retaining plug to hold the control lever in said recess pivot.

Another object of the invention is to provide a gearshift position indicator having a light and indicator housing attached to the shell and a dial attached to a fixed portion of the housing supported on the steering column.

A further object of the invention is to provide in a gearshift control mechanism the control tube on a steering column and having a fixed lever secured thereto to transfer the shifting movement and a cam member secured thereto to transfer the selector movement and a lever for transferring the selecting movement pivoted to said steering column and having a pin engaging the selector cam.

Another object is to secure the fixed lever directly to the control tube and to secure the hardened steel cam member to the fixed lever. A further object is to provide a novel telescoping steering column which is clamped together by a clamping ring which also provides support for the bracket for pivotally mounting the selector lever.

These and other objects of the invention will be apparent from the following detailed description of the preferred embodiments of the invention illustrated in the specification and drawings in which:

Figure 1 is a partial elevation with parts broken away and in section to show details of the invention.
Figure 2 is a section of Figure 1 on the line 2—2.
Figure 3 is a section of Figure 1 on the line 3—3.
Figure 4 is an elevation of the lower portion of Figure 1 taken in the direction of the arrows 4—4 in Figure 1.
Figure 5 is a section of Figures 1 and 4 on the line 5—5.
Figure 6 is a partial elevational view with parts broken away and in section showing a modification.
Figure 7 is a partial section of Figure 6 on the line 7—7.
Figure 8 is a partial section of Figure 9 on the line 8—8.
Figure 9 is a partial elevation of a modified form with parts broken away and in section as shown in details.
Figure 10 is a partial elevation of Figure 9 on the line 10—10 with parts broken away and in section.
Figure 11 is a fragmentary view on line 11—11 of Figure 10 showing a detail of an indicator light mounting.

Referring to the drawings, the invention is illustrated on a motor vehicle steering column structure. A steering column 10 of generally tubular form is the main supporting structure of the unit and is secured to the vehicle in the conventional way. The upper end of the steering column 10 has attached thereto a cylindrical extension 12 which provides support for the bearing bracket 14 at the upper end of the steering column. The bearing bracket 14 is thus secured to the steering column 10 and rotatably supports the steering shaft 16 by means of a thrust bearing 18. The upper end of the steering shaft 16 is suitably secured to the steering wheel 20 to control the steering of the vehicle through the normal steering gear linkage. A fixed housing member 22 which is interchangeable with a signal light control and a fixed housing member 24 which is interchangeable with a gearshift position indicator mechanism are supported by suitable means (not shown) on the steering column 10 just below the wheel 20.

The upper portion of the control linkage is rotatably supported on the extension 12 at the upper end of the steering column. The details of this mounting arrangement are best illustrated in Figure 1. The steering column extension 12 has a lower groove 26 and a snap ring 28 and an upper groove 30 and a snap ring 32. These snap rings provide upper and lower bearing members for rotatably supporting the shell or bowl 34 concentrically with the steering column 10. The shell 34 has an inner cylindrical bearing portion 36 which fits closely around the steering column extension 12 and extends from the lower split ring 28 to the upper split ring 32. The ends of the cylindrical bearing portion 36 engage the snap rings to limit axial movement of the shell 34. An annular bronze bearing or member 38 may be positioned between the upper end of the cylindrical member 36 and the ring 32 to provide an improved bearing for the shell. A similar lower bearing (not shown) may also be used. The shell member 34 and the inner cylindrical member 36 have a large boss 40 interconnecting the members to secure them together and also provide an anchorage for the gearshift hand control lever 42. The boss 40 has an opening consisting of a large cylindrical threaded recess 44 extending part way into boss 40. From the base of the recess 44 a vertical slot 46 extends through the remainder of the boss 40 to the inside of the cylindrical member 36. At each side of the slot 46 a journal recess 48 is provided in the base of recess 44 to provide a bearing member for the pintle pins 50 secured to the outside of the ears 52 on each side of the lever 42. The pintle pins 50 are secured in the journal recesses 48 by means of a U-shaped fastener 53 which is seated in the base of the recess 44. At the center of each leg of the U-shaped fastener a rounded offset portion 54 is provided to engage the outer surface of the pins 50 and secure the pins in the journal recess 48. A retainer washer 56 having a generally U-shape is positioned over the fastener 52 and the assembly is secured in position by a hollow threaded cap 58 which is screwed into the threaded recess 44. The cap 58 has an aperture 59 through which the handle 42 passes. A spherical shield 61 is secured to the handle to close the aperture 59 in any position of the lever 42.

The inner end of the control lever 42 is enlarged to provide a bell mouth portion 60 so that the stud lever 62 may move vertically within the lever 42. The stud lever has a spherical end portion 64 which is pivotally mounted in the hollow control lever 42 to provide a pivotal connection between the stud and the control lever. An antirattle spring 66 engages the spherical portion 64 of stud 62 and a seat 68 positioned in the control lever 42 to take up extra clearance and thereby prevent noise. The stud lever 62 has a threaded inner end portion 70 which is threaded into an aperture in the reinforcing ring 72. The reinforcing ring is suitably secured by welding or other means to the upper end of the control tube 74. The control tube 74 is coaxially mounted about the steering shaft 16. At the upper end of the steering column extension 12 a plurality of raised bearing portions 76 extend inwardly to rotatably and slidably support the shift tube 74.

The shift tube extends downwardly in the steering column to a point below the floor boards of the vehicles where the suitable connections are provided with the transmission. The main portion of the steering column 10 terminates at this point. The lower portion 80 of the steering column is coaxially secured to the main portion 10 by an attaching sleeve 82 which fits over and is secured by suitable means such as a press fit or welding to the lower steering column portion 80. The attaching sleeve 82 also slips over the main steering column portion 10. A clamping band 84 surrounds this portion of the sleeve as best shown in Figure 4 and is clamped by a suitable nut and bolt fastener 86. The sleeve 82 has an aperture 88 and the lower steering column portion 80 has a similar aperture or recess 90 in the top edge to provide access to the control tube for the selector and shift mechanism. The attaching tube 82 is slotted at 92 from the aperture 88 to the upper end so that the band 84 may contract the sleeve about the steering column 10.

The shift lever 94 has an aperture 96 with an integral circumferential flange 98 extending laterally from the periphery of the aperture and surrounding the shift tube 74. The shift lever 94 is made of mild steel and thus the integral flange 98 may be welded to the mild steel shift tube 74 to secure the parts together. An annular cam ring 100 having a U-shaped cross section is seated on the flange 98 and secured to the flange and lever assembly 94 by means of a plurality of stakings 102 in the lower edge of the flange 98 spaced around the circumference of the flange. The cam ring 100 is staked to the lever 94 rather than welded thereto since it is difficult to spot weld the high carbon steel which is used for the cam ring to low carbon steel which is used for the shift lever 94 and the control tube 74.

The selector lever 104 is pivotally mounted on a pin 106 mounted on the bracket 108. The lever 104 has a reversely bent end portion 110 as best shown in Figures 4 and 5 in order to provide a U-shaped end portion consisting of two parallel lever portions. A pair of aligned apertures for the pin 106 are provided in the parallel portions 104 and 110 of the lever. The bracket 108 also has a reversely bent end portion 112 to provide two parallel bracket portions. The end portion and the reversely bent portion of the bracket are transversely directed to provide a transversely positioned U-shaped portion to provide spaced portions to support the pivot pin 106. As best shown in Figure 5 the U-shaped portions of the end of the bracket 108 are both positioned outside of the U-shaped end portions of the lever 104. A cam pin 114 which rides in the cam ring 100 is positioned in a pair of aligned apertures in both the lever 104 and the reversely bent portion 110 adjacent the end.

The control tube 74 rests in its lower position when the cam ring 100 engages a bumper 116 made of rubber or other shock absorbing material. The bumper 116 has an internal groove 118 which engages an outwardly extending flange 119 of the annular support 120. The support 120 has a central cylindrical portion and at its lower end an outwardly extending foot 122 which rests on the oil seal and silencer 124. The oil seal 124 which is made of suitable packing material such as woven or felted fiber rests on the guide bushing 126 and slidably engaging the control tube. The guide bushing 126 extends inwardly and terminates in an axially extending guide and bearing flange 128 which will positively prevent excessive displacement of the control tube 74. The guide bushing 126 has an upwardly extending securing flange 130 which is secured to the lower steering column 80 by suitable means such as welding. The control tube and cam ring assembly is resiliently retained in engagement with the bumper 116 by a coil spring 132 surrounding the tube and supported by the flange of the spring retainer 134. The outer flange 136 of the spring retainer engages the lower end of the steering column 12 in order to position the spring retainer.

A modified connection between the shift tube 74 and the shift lever and the selector lever at the lower end of the steering column is illustrated in Figures 6 and 7. The shift tube 74 is positioned around the steering shaft 16 and within the modified steering column 140. The steering column has a large aperture 142 on one side to provide an opening for the shift and selector levers and a narrower slot 144 extending from the opening 142 to the lower end 146 of the steering column 140. The lower portion 148 of the steering column telescopingly fits within the lower end 146 of the steering column 140 which is expansible due to the opening 142 and slot 144. A bearing member 150 having a cylindrical shape is telescopingly positioned within the upper end of the lower steering section 148. The top of the bearing member 150 has an outwardly directed annular flange 152 which seats on the top edge of the upper end of steering column 148 to axially position the bearing member within the steering column. The lower end of the bearing member 150 has an inwardly directed flange 154 engaging the shift tube 74 to provide a lower bearing support.

The shift lever 156 is provided at one end with an aperture 158 and an integral axially directed flange 160 at the periphery of the aperture and surrounding the shift tube. The flange 160 provides sufficient bearing surface so that the shift lever 156 may be firmly spot welded to the control tube 74. The annular cam ring 162 has a U-shaped cross section and is positioned on the flange 160 of the shift lever 156. The lower end of the flange 160 is turned outwardly at 164 to firmly engage and secure the cam ring 162 to the shift lever 156 by a clamping action between the flange 160 and the main part of the lever 156. The upper end of the lower portion of the steering column 148 and the lower end of the upper portion of the steering column 140 are clamped together by a band 166 in their overlapping or telescoping region. The band 166 is split and has a pair of ears 168 which are suitably apertured to receive a fastening bolt 170 to clamp the band 166 about the steering column. A support bracket 172 is secured by suitable means such as welding 174 to the band 166. As best shown in Figure 7, the bracket extends upwardly and outwardly on the side of the steering column. The top of the support bracket, as shown in dotted lines in Figure 6 and as shown in Figure 7, has a reversely bent portion 176. The reversely bent portion 176 provides a downwardly directed U-shaped end portion on the support bracket 172. The opposed portions of the U-shaped end of the support bracket have a pair of aligned apertures to receive a pivot pin 178. A selector lever 180 has a main portion positioned outside of the reversely bent part 176 of the bracket and a reversely bent portion 182 positioned between the parts 172 and 176 of the U-shaped end of the bracket and adjacent the main portion 172 of the bracket. The lever 180 and its reversely bent portion 182 have aligned apertures to receive the pivot pin 178. The lever 180 and the reversely bent portion 182 are also suitably apertured to receive a cam pin 184 which extends inwardly through the aperture 142 in the steering column and into the cam ring 162.

The control tube 74 is provided with a bumper assembly consisting of a bumper 186 of resilient material such as rubber supported on the steering column for engagement with the cam ring or the roll portion 164 of the flange 160. The resilient bumper member 186 has a thin steel washer 188 on each side to protect the rubber bumper. The rubber bumper and the protecting washers are supported on a heavy washer 190 which is retained within the steering column by the retainer ring 192. The retainer ring 192 has three outwardly directed projections 194 which fit into slots 196 (preferably three equally spaced slots) in the steering column. The shift tube 74 is resiliently urged against the bumper 186 by the coil spring 198 which seats against the spring seat 200. The spring seat is a washer shaped element which may have an internal flange 202 to position the spring on the seat. The spring seat is positioned within the steering column by a plurality of inwardly bent tongues 204, preferably three in number and equally spaced around the circumference of the steering column. The tongues 204 are formed in the conventional manner by forming a U-shaped slit in the steering column wall and displacing the base of the U inwardly to provide a shoulder or abutment.

Figures 8 to 11 illustrate the invention with further refinements especially suited to control an automatic transmission. In these drawings, the structure as illustrated provides four control positions. Since the structure is generally the same as that illustrated in Figures 1 to 3 the same reference numerals will be used in the description to designate the same parts and additional parts will be designated by new numbers. In this form of the invention, the steering column 10' also has an adaptor or extension 12' secured thereto at its upper end to support the gearshift control mechanism. The steering shaft 16' is positioned centrally within the steering column in the conventional manner and extends upwardly where it is supported on the steering column and connected to the steering wheel as illustrated in Figure 1. Just below the steering wheel, a housing 22' which may be replaced by a direction signal switch is supported on the steering column. Just below the direction signal housing a thin annular housing 24' is fixed to the steering column. The housing 24' is similar to the housing 24 but has a recess 209 which provides a seat for securing the indicator dial 210 to the housing 24'. The dial 210 shaped like a segment of an annulus may be made of a suitable transparent material such as plastic and is secured to the member 24' by suitable screws 212.

The bowl 34' is rotatably mounted on the steering column extension 12' immediately below the indicator dial support 24'. The bowl 34' has an outer tapered wall portion to provide a tapered surface between the dial support housing 24' and the steering column and an inner bearing member 36'. The bearing member 36' is integrally attached to the outer portion by the interconnecting portion 40'. The cylindrical internal bearing surface of bearing 36' closely surrounds the steering column extension 12' to rotatably support the bowl. The cylindrical bearing portion 36' is supported at its lower end by split ring 28' which fits into a recess 26' in the extension 12'. The cylindrical bearing is retained at the upper end by a split ring 32' which fits in a groove 30' in the steering column extension 12'. In order to prevent binding and to ease the movement of the bowl 34' an annular bronze shim bearing 214 having an L-shaped cross section is positioned at the upper and lower inner edge of the cylindrical bearing 36'.

The gearshift lever handle 42' is supported on pins mounted on the ears 46'. The pins are retained in the bowl 34' by the bushing 58' as best described above in connection with Figures 1 to 3. Lever 42' engages at its center portion a stud lever 62, which has an inner end secured by threads to a reinforcing sleeve 72' on the upper end of the control tube 74'. The reinforcing sleeve 72' has a stop pin or member 216 secured thereto by suitable means such as threads. The stop member extends into the opening 45' which is provided in the steering column extension to allow a stud lever 62' to pass through. The lower end of the opening is provided with a raised portion 218 which prevents movement of the shift mechanism into the reverse driving range for automatic transmissions without lifting the gearshift lever.

One side of the bowl 34' also has an aperture 220 for an indicator light and socket 222 and housing 224. The housing has a generally hollow semicircular cross section and fits against the bowl 34' surrounding the opening 220. The lower end of the light housing 224 tapers to a point while the upper end is provided with an end wall 225 having a small aperture 226 to allow a small beam of light to illuminate a portion of the indicated dial 210. The housing 224 also has a pointed extension 228 at its upper end which fits around the outer edge of the dial 210 to indicate the position of the shift mechanism in addition to the light indication. The light and socket 222 are mounted in a generally U-shaped bracket 230 which is secured to the light fitting. The legs of the bracket are provided substantially at the mid-portion with a substantially rectangular protrusion 232 which fits in a recess 234 in the wall of the bowl 34' and an outwardly bent U-shaped retainer portion 236 which engages the inside edge of the bowl 34' around the opening 220. The inwardly tapered terminal portions 238 of the bracket 230 allow the bracket to be readily inserted in the opening.

In this gearshift mechanism, the vertical movement of the control lever 42 effects the selecting movement in the transmission and the rotary movement of the control lever about the steering column axis effects the shifting movement in the transmission. In this structure, the control tube 74 is mounted in the steering column structure about the steering shaft 16 and within the steering column 10. The control tube is supported for both axial reciprocating movement and rotary movement with respect to the steering shaft or column at the upper end by the projections 76 which engage in bearing relation the control tube reinforcing member 72. The lower end of the control tube is similarly supported by the gasket 124 and bearing flange 128 of the bearing member 126. The bowl 34 has a central cylindrical bearing portion which fits closely around the steering column extension 12 and therefore provides a rotary bearing support for the bowl and hand control lever 42. The control lever 42 is pivotally mounted by means of the pins 50 on the bowl 34 for pivotal movement about the pins. The pins 50 are pivotally secured on the bowl 34 by a pintle retainer spring 53 which is held in position in the aperture by the annular cap 58. It will be noted that the cap 58 engages the edge portions of the retainer 53 and thus holds the pintle pins 50 in proper position. The cap 58 has a hollow center and an aperture 59 with sufficient clearance to allow the large portion 60 of the lever 42 to move up and down through a small angle relative to the bowl 34. The movement of the lever 42 is transferred to the control tube 74 by a stud lever 62 which is fixed in the reinforcing sleeve 72 on the upper end of the control tube. Thus it will be seen that if the lever 42 is moved up and down so that it pivots on the pins 50 about the bowl 34 the inner end 64 of the lever 62 will be moved up and down. Since the lever 62 is a rigid extension of the control tube 74, the control tube 74 and lever 62 will be reciprocated as a unit. When the lever 42 is rotated about the steering column axis, the lever will be effectively fixed to the bowl 34 by the pins 50 and will therefore rotate the bowl about the bearing 36. The lever 42 will also rotate the stud lever 62 which is positioned within the narrow portion of the lever 42 and is fixedly secured at its other end to the control tube 74. Therefore, the control tube, the reinforcing sleeve, the stud lever, the bowl, and the control lever will rotate about the steering column axis as a unit.

The up and down or reciprocating movement of the control lever and control tube will be transferred to the selector lever 104 and the rotary motion of the control tube and control lever will be transferred to the shift lever 94. When the control tube is reciprocated the annular cam 100 which is fixed to the tube will also be reciprocated. Since the pin 114 rides in the cam 100, it will be moved up and down axially of the steering column. This movement of the pin 114 which is attached to one end of the lever 104 will pivot the lever about the centrally located pin 106 and thus move the other end of the lever 104. Suitable linkage means are there provided to connect the free end of lever 104 with suitable mechanism in the transmission. The shift movement is directly transferred from the rotary movement of the control tube to the rotary movement of the shift lever 94 which is directly connected to the control tube. The shift movement is transferred from the free end of the shift lever 94 by means of a suitable linkage connection to the transmission mechanism.

In this form of the invention, the upper section 12 and lower section 80 of the steering column are of the same diameter and therefore are secured together by an attaching sleeve 82 which fits over the adjacent ends of each of the steering column sections. The attaching sleeve is retained in position by suitable clamping band 84. The support bracket for the selector lever is fixed to the attaching sleeve 82.

In the modified form of the invention illustrated in Figures 6 and 7, the upper section 140 and lower section 148 of the steering column are arranged in telescopic relationship with the lower section positioned inside the upper section. A clamping band 166 is positioned around the steering column sections where they overlap in order to secure them together. The support member 172 for the selector lever pivot is secured to the clamping band 166. This construction readily allows for adjustment of the length of a steering column without affecting the dimensions of the other portions of the mechanism. It is also pointed out that the downward movement of the shift tube is limited by a bumper assembly consisting of a rubber washer 186 having the surfaces protected by thin washers 188. This bumper assembly is supported on a snap ring 192 which fits within the steering column 140 and engages positioning apertures 196 in the steering column. The control tube is resiliently positioned against the bumper 186 by coil spring 198 suitably seated on spring seat 200. The control levers 156 and 182 function in the same manner as the control levers in the above described modification.

When the control mechanism is employed to provide a gearshift control for automatic transmissions which generally have a neutral position and two positions for forward driving and one for reverse driving, it is advisable to provide some detent means to prevent inadvertent shifting into the reverse driving range. In this mechanism illustrated in Figures 8 to 11, this is done by securing a stop member 216 to the control tube and providing a raised cam surface 218 on the lower edge of the aperture 45. Thus in order to move the control tube into this range the gearshift lever 42 must first be raised to lift the control tube 74' and then rotated to rotate the control tube to the reverse range. The position of the shift mechanism is indicated by a pointer 228 which extends from the housing 224 and fits over the edge of the dial 210. Thus the position of the shift mechanism is indicated by a mechanical pointer at all times. For better indication of the shift position, a light is also positioned within the housing 224. The light provides a small beam of lighting extending upwardly through an aperture in the top end of the wall of the housing which illuminates a portion of the dial 210 to indicate the gearshift position when there is not sufficient illumination to see the mechanical pointer.

The above described gearshift control mechanisms are illustrative of the invention. It will be apparent that numerous modifications may be made within the scope of the appending claims.

We claim:

1. In a gearshift control mechanism, a support column, a control tube, said support column supporting said control tube for rotary and reciprocating movement about a fixed axis, a member rotatably mounted on said support column, hand control means pivotally mounted on one side of said member, means having a connection to said hand control means and a connection to said control tube and one of said connections being a pivotal connection permitting longitudinal sliding movement longitudinally of said hand control means to rotate and to reciprocate said control tube when said hand control means is moved.

2. In a gearshift control mechanism, a support tube, a control tube mounted in said support tube for rotary and reciprocating movement about its axis, a control lever secured to said control tube to transfer rotary movement of said control tube to said lever, a cam secured to said lever, a bracket secured to said support tube, a pivoted lever pivotally mounted on said bracket, a cam follower on said pivoted lever engaging said cam.

3. In a gear shift control mechanism, a support column, a control tube mounted within said support column, bearing means on said support column to support said control tube for rotary and reciprocating movement, a shell rotatably mounted on said column, an opening in said shell having a shoulder and pivot recesses, a hollow hand control lever having ears extending into said opening, pintle pins secured to said ears and seating in said recesses, means secured in said opening and positioned over said recesses to hold said pins in said recesses, a stud secured to said control tube and extending into said hollow hand control lever for pivotal engagement to reciprocate and rotate said control tube, and means to connect the control tube with the gearshift mechanism.

4. In a gearshift control mechanism, a support column consisting of an upper part and a lower part, a control tube mounted within said support column for rotary and reciprocating movement about the control tube axis, a shell rotatably mounted on the upper end of said support column, an opening in said shell having a shoulder and pivot recesses, a hand control lever having ears extending into said opening, said ears having pintle pins seating in said recesses, means secured in said opening to hold said pins in said recesses, a stud secured to said control tube and pivotally connected to an intermediate portion of said hand control lever, a lever secured to the lower end of said control tube, a second lever pivoted to said support column and operatively connected to said control tube.

5. In a gearshift control mechanism, a support column consisting of an upper part and a lower part, a control tube mounted within said support column for rotary and reciprocating movement about the axis of the control tube, hand control means connected to said control tube to rotate and reciprocate said control rod, a lever having an aperture at one end, a flange surrounding said aperture, said control tube extending through said aperture and being secured to said flange, a cam ring secured to said flange, a bracket secured to said support column, a second lever pivoted to said bracket and a cam follower mounted on said second lever and engaging said cam ring.

6. In a gearshift control mechanism, a support column consisting of an upper part and a lower part, a control tube mounted concentrically within said support column, bearing means on said support column to support said control tube, a shell rotatably mounted on the upper end of said column, an opening in said shell having a shoulder and pivot recesses, a hollow hand control lever having ears extending into said opening, pintle pins secured to said ears and seated in said recesses, means secured in said opening to hold said pins in said recesses, a stud secured to said control tube and extending into said hollow hand control lever for pivotal engagement, an aperture in the lower part of said support column, a lever having an aperture at one end, a flange surrounding said aperture, said control tube extending through said aperture and being secured to said flange, a U-shaped cam ring secured to said flange, a sleeve telescoping over said upper and lower support column parts, a bracket secured to said sleeve, a second lever pivoted to said bracket and a cam pin mounted on said second lever and engaging said cam ring.

7. In a gearshift control mechanism, a support column consisting of an upper part and a lower part, a control tube, said support column supporting said control tube for rotary and reciprocating movement above the control tube axis, a member rotatably mounted on the upper end of said column, an opening in said member having a shoulder and pivot recesses, a hand control lever extending into said opening, pintle pins secured to said lever and seated in said recesses, means secured in said opening to hold said pins in said recesses, a stud secured to said control tube and extending outwardly and pivotally engaging said hand control lever, a lever having an aperture at one end, a flange surrounding said aperture, said control tube extending through said aperture and being secured to said flange, a cam ring secured to said flange, a sleeve telescoping over said upper and lower support column parts, a bracket secured to said sleeve, a second lever pivoted to said bracket and a cam pin mounted on said second lever and engaging said cam ring.

8. In a gearshift control mechanism, a support column consisting of an upper part and a lower part, a control tube mounted within said support column for rotary and reciprocating movement about the axis of the control tube, a member rotatably mounted on said support column, a hollow hand control lever, means to pivotally mount said hand control lever on said member for swinging movement along said axis, a stud secured to said control tube and extending into said hollow hand control lever for pivotal engagement, said support column having an opening near the meeting edges of the upper and the lower part of said support column, a lever having an aperture at one end, a flange surrounding said aperture, said control tube extending through said aperture and being secured to said flange, a cam secured to said flange, said lever extending through said opening, a sleeve telescoping over said upper and lower support column parts, a bracket secured to said sleeve, a second lever pivoted to said bracket and cam follower means mounted on said second lever and engaging said cam to actuate said second lever and said second lever and cam follower extending through said aperture.

9. In a gearshift control mechanism, a support tube, a control tube mounted in said support tube for rotary and reciprocating movement, means to reciprocate and to rotate said control tube, a lower support tube telescopingly engaging said support tube, one of said support tubes having an opening adjacent the telescoping ends, a control lever secured to said control tube to transfer rotary movement of said control tube to said lever, said control lever extending through said opening, a cam secured to said control tube, a clamping band surrounding said support tube and lower support tube in the telescoping region, a bracket secured to said clamping band, pivoted lever means pivotally mounted on said bracket and having a cam follower, said pivoted lever means extending through said opening, and said cam follower engaging said cam to transfer reciprocating movement of said control tube to said pivoted lever.

10. In a gearshift control mechanism, a support tube, a control tube mounted in said support tube for rotary and reciprocating movement, means to reciprocate and to rotate said control tube, a lower support tube coaxially secured to said support tube, one of said support tubes having an opening adjacent the juxtaposed ends, a control lever secured to said control tube to transfer rotary movement of said control tube to said lever, said control lever extending through said opening, a cam secured to said control tube, a clamping band surrounding one of said support tubes and said lower support tube, a bracket secured to said clamping band, pivoted lever means pivotally mounted on said bracket and having a cam follower, said pivoted lever means extending through said opening, and said cam follower engaging said cam to transfer reciprocating movement of said control tube to said pivoted lever.

11. In a gearshift control mechanism, a support tube, a control tube mounted in said support tube for rotary and reciprocating movement about its axis, means to reciprocate and to rotate said control tube, an opening in the lower end of said support tube, a lower support tube coaxially abutting said support tube, a sleeve telescopingly engaging said support tube and said lower support tube, a control lever secured to said control tube to transfer rotary movement of said control tube to said lever, said control lever extending through said opening, a cam secured to said control tube, a clamping band surrounding said sleeve, a bracket secured to said clamping band, a pivoted lever pivotally mounted on said bracket, and a cam follower on said pivoted lever extending through said opening and engaging said cam to transfer reciprocating movement of said control tube to said pivoted lever.

12. In a gearshift control mechanism, a support tube, a control tube mounted in said support tube for rotary and reciprocating movement about its axis, means to reciprocate and to rotate said control tube, an opening in the lower end of said support tube, a lower support tube coaxially secured to said support tube, a control lever having an aperture at one end, a flange integral with said lever and perpendicular to said lever at the edge of said aperture, said control tube extending through said aperture and engaging said flange, said flange being secured to said tube to transfer rotary movement of said control tube to said lever, said control lever extending through said opening, a cam ring having a groove secured to said flange, a clamping band surrounding one of said support tubes and said lower support tube, a bracket secured to said clamping band, a pivoted lever pivotally mounted on said bracket, and a cam follower on said pivoted lever extending through said opening and engaging said cam groove to transfer reciprocating movement of said control tube to said pivoted lever.

13. In a gearshift control mechanism, a support tube, a control tube mounted in said support tube for rotary and reciprocating movement about its axis, means to reciprocate and to rotate said control tube, an opening in the lower end of said support tube, a lower support tube coaxially abutting said support tube, a sleeve telescopingly engaging said support tube and said lower support tube, a control lever having an aperture at one end, a flange integral with said lever and perpendicular to said lever at the edge of said aperture, said control tube extending through said aperture and engaging said flange, said flange being secured to said tube to transfer rotary movement of said control tube to said lever, said control lever extending through said opening, a cam ring having a groove secured to said flange, a clamping band surrounding said sleeve, a bracket secured to said clamping band, a pivoted lever pivotally mounted on said bracket, and a cam follower on said pivoted lever extending through said opening and engaging said cam groove to transfer reciprocating movement of said control tube to said pivoted lever.

14. In a gearshift control mechanism, a support tube, a control tube mounted in said support tube for rotary and reciprocating movement about its axis, means to reciprocate and to rotate said control tube, an opening in the lower end of said support tube, a lower support tube telescopingly engaging said support tube, a control lever having an aperture at one end, a flange integral with said lever and perpendicular to said lever at the edge of said aperture, said control tube extending through said aperture and engaging said flange, said flange being secured to said tube to transfer rotary movement of said control tube to said lever, said control lever extending through said opening, a cam ring having a groove secured to said flange, a clamping band surrounding said support tube and lower support tube in the telescoping region, a bracket secured to said clamping band, a pivoted lever pivotally mounted on said bracket, and a cam follower on said pivoted lever extending through said opening and engaging said cam groove to transfer reciprocating movement of said control tube to said pivoted lever.

15. In a gearshift control mechanism, a support tube, a control tube mounted in said support tube for rotary and reciprocating movement about its axis, a bracket member secured to said support tube, the free end of said bracket having a reversely bent portion, a pivot pin secured in aligned apertures in said bracket and said reversely bent bracket portion, a pivoted lever member having a reversely bent portion, aligned apertures in the said pivoted lever and said reversely bent lever portion for pivotally receiving said pivot pin, one of said reversely bent portions being positioned between the other member and its reversely bent portion, said control tube having a cam, and a cam follower on said lever engaging said cam.

16. In a gearshift control mechanism, a support column, a control tube mounted within said support column for rotary and reciprocating movement about the control tube axis, a shell rotatably mounted on said column, an opening in said shell having a shoulder and pivot recesses, a hollow hand control lever extending into said opening, pintle pins secured to said lever and seated in said recesses, means secured in said opening to hold said pins in said recesses, and a stud secured to said control tube and extending into said hollow hand control lever for pivotal engagement to rotate and reciprocate said control tube.

17. In a shift control mechanism a support column, a control tube, said support column supporting said control tube for rotary and reciprocating movement about a fixed axis, a member for axial movement in a plane containing the axis of the control tube rotatably mounted on said support column, hand control means pivotally mounted on said member, means having a pivotal connection to said hand control means and an axially fixed connection to said control tube and one of said connections providing for longitudinal sliding movement longitudinally of said hand control means to rotate and to reciprocate said control tube when said hand control means is moved.

18. In a shift control mechanism, a support tube having a first portion and a second portion positioned in juxtaposed aligned relation, said support tube having an opening adjacent the meeting edges of said juxtaposed portions, a control tube mounted in said support tube for rotary and reciprocating movement about its axis, a control lever secured to said control tube and extending through said opening to transfer rotary movement of said control tube to said lever, a cam secured to said control tube, a bracket means securing said support tube portions together, a pivoted lever means pivotally mounted on said bracket having a cam follower, said pivoted lever means extending through said opening, and said cam follower on said pivoted lever means engaging said cam.

19. In a shift control mechanism, a support column, a control tube, said support column supporting said control tube for rotary and reciprocating movement, a member rotatably mounted on said support column, said member having an axial wall having an opening facing transversely with respect to said control tube, a hollow hand control lever extending through said opening, means pivoting said hollow hand control lever, to said wall of said member, and a stud on said control tube extending into said hollow hand control lever for pivotal engagement to rotate and reciprocate said control tube when the hand control lever is moved.

20. In a shift control mechanism, a first support tube, a control tube mounted in said first support tube for rotary and reciprocating movement, means to reciprocate and rotate said control tube, a second support tube coaxially positioned adjacent said pivot support tube, one of said support tubes having an opening near the adjacent ends of said support tubes, a control lever secured to said control tube to transfer rotary movement of said control tube to said lever, said control lever extending through said opening, a cam secured to said control lever, means securing said support tubes together and having a mounting, pivoted lever means pivotally mounted on said mounting and having a cam follower, said pivoted lever means extending through said opening and said cam follower engaging said cam to transfer reciprocating movement of said control tube to said pivoted lever.

21. In a gearshift control mechanism, a support column, a control tube mounted within said support column, bearing means on said support column to support said control tube for rotary and reciprocating movement, a shell rotatably mounted on said support column, an opening in said shell having a shoulder and pivot recesses, a hollow hand control lever having ears extending into said opening, pintle pins secured to said ears, securing means secured in said opening, cooperating means on said shoulder and said securing means to pivotally support said pintle pins between said shoulder and said securing means, a stud secured to said control tube and extending into said hollow hand control lever for pivotal engagement to reciprocate and rotate said control tube, and means to connect the control tube with the gearshift mechanism.

References Cited in the file of this patent

UNITED STATES PATENTS

| Number | Name | Date |
|---|---|---|
| 1,690,956 | Tokuhisa | Nov. 6, 1928 |
| 2,282,962 | Hawkins | May 12, 1942 |
| 2,303,049 | Ingalls | Nov. 24, 1942 |
| 2,319,716 | Bixby | May 18, 1943 |
| 2,334,421 | Leach | Nov. 16, 1943 |
| 2,455,179 | Jovanovich | Nov. 30, 1948 |
| 2,455,204 | Wharam | Nov. 30, 1948 |
| 2,584,058 | Squire | Jan. 29, 1952 |